(12) United States Patent
Yamada et al.

(10) Patent No.: US 7,678,447 B2
(45) Date of Patent: Mar. 16, 2010

(54) PROTECTIVE COVER FOR DISPLAY PANEL AND ITS USE

(75) Inventors: Kazuhiro Yamada, Saitama (JP); Yasuhiro Sakai, Saitama (JP); Hiroyuki Nakayama, Tokyo (JP); Maki Yamada, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/557,569

(22) Filed: Nov. 8, 2006

(65) Prior Publication Data

US 2007/0109650 A1 May 17, 2007

(30) Foreign Application Priority Data

Nov. 16, 2005 (JP) ............................ P2005-332031

(51) Int. Cl.
*B32B 5/16* (2006.01)
(52) U.S. Cl. ..................................... 428/323
(58) Field of Classification Search ................... 428/323
See application file for complete search history.

(56) References Cited

U.S. PATENT DOCUMENTS

| | | | |
|---|---|---|---|
| 3,796,777 A | | 3/1974 | Netting |
| 4,297,401 A | * | 10/1981 | Chern et al. ................. 428/1.53 |
| 4,590,117 A | * | 5/1986 | Taniguchi et al. ............ 428/212 |
| 6,210,625 B1 | | 4/2001 | Matsushita et al. |
| 2001/0005229 A1 | * | 6/2001 | Misawa et al. .......... 348/333.01 |
| 2001/0033913 A1 | * | 10/2001 | Murata et al. ................ 428/143 |
| 2003/0176124 A1 | * | 9/2003 | Koike et al. .................... 442/16 |
| 2004/0058177 A1 | * | 3/2004 | Yoshikawa et al. ........... 428/515 |
| 2004/0253427 A1 | * | 12/2004 | Yokogawa et al. ........... 428/212 |
| 2005/0083465 A1 | * | 4/2005 | Niiyama et al. .............. 349/122 |
| 2006/0159867 A1 | * | 7/2006 | O'Donnell ................... 428/1.5 |
| 2006/0188720 A1 | | 8/2006 | Kato et al. |

FOREIGN PATENT DOCUMENTS

| | | |
|---|---|---|
| JP | 36-012577 | 10/1957 |
| JP | 43-002107 | 8/1963 |
| JP | 49-037565 | 10/1974 |
| JP | 58-120525 | 7/1983 |
| JP | 61-174145 | 8/1986 |
| JP | 5-125127 | 5/1993 |
| JP | 10-258223 | 9/1998 |

(Continued)

OTHER PUBLICATIONS

J. Brandrup, E. H. Immergut and E. A. Grulke, Polymer Handbook Forth Edition, VII/688-694, John Wiley & Sons, Inc. (1999).*

(Continued)

*Primary Examiner*—Callie E Shosho
*Assistant Examiner*—Elizabeth Robinson
(74) *Attorney, Agent, or Firm*—Reed Smith LLP

(57) ABSTRACT

A protective cover for a display panel, comprising a transparent substrate, and an anti-reflection, transparent medium layer comprising hollow, transparent, fine particles dispersed in a transparent resin matrix and sealed without gap between the a transparent substrate and an image-displaying area of the display panel, the refractive index $N_1$ of the anti-reflection, transparent medium layer and the refractive index Ns of the transparent substrate meeting the following relation (1):

$$No < N_1 < Ns^2 \qquad (1),$$

wherein No is the refractive index of air.

10 Claims, 8 Drawing Sheets

FOREIGN PATENT DOCUMENTS

| | | |
|---|---|---|
| JP | 2003-302620 | 10/2003 |
| JP | 2004-284864 | 10/2004 |
| JP | 2004-285394 | 10/2004 |

OTHER PUBLICATIONS

Knovel Critical Tables Basic Properties of Chemical Compounds, Knovel, 2003.*

English Language Abstract of JP 2003-302620.
English Language Abstract of JP 61-174145.
English Language Abstract of JP 58-120525.
English Language Abstract of JP 10-258223.
English Language Abstract of JP 2004-285394.
English Language Abstract of JP 2004-284864.
English Language Abstract of JP 5-125127.

* cited by examiner

PROTECTIVE COVER FOR DISPLAY PANEL AND ITS USE

FIELD OF THE INVENTION

The present invention relates to an inexpensive protective cover having excellent anti-reflectiveness for a display panel, and a digital camera comprising such a protective cover.

BACKGROUND OF THE INVENTION

Various types of equipment provided with liquid crystal displays, such as digital cameras, have been becoming widely used recently. However, the liquid crystal displays have image-displaying areas vulnerable to damage by shock, resulting in losing a displaying function. To solve such problem, JP 2003-302620A discloses, as shown in FIG. 11, a liquid crystal display comprising a protective cover 100 comprising a frame 32 having an internal, annular flange 30 and a transparent substrate 10 supported by the internal, annular flange 30, the transparent substrate 10 being opposing an image-displaying area 20 of a liquid crystal panel 21. However, because this liquid crystal display with this structure has a space 50 between the transparent substrate 10 and the image-displaying area 20, incident light rays X are reflected to light rays $X_1$ and $X_2$ by at an interface between a front surface of the transparent substrate 10 and the outside air layer, and at an interface between a rear surface of the transparent substrate 10 and an air layer inside the space 50, resulting in decreased image visibility.

It has thus been proposed to subject a transparent substrate for protecting a liquid crystal display to an anti-reflection treatment or an anti-glare treatment. For instance, the formation of a low-refractive-index, anti-reflection coating, for instance, a thin layer of magnesium fluoride, etc., on the transparent substrate can reduce reflectance. Also, the anti-glare treatment, for instance, blasting, etc., forms fine raggedness on a surface of the transparent substrate, resulting in obscuring reflected image by light scattering. It has been found, however, that a transparent substrate provided with a known anti-reflection coating fails to sufficiently suppress the surroundings from being visible on the transparent substrate. On the other hand, the anti-glare treatment makes the transparent substrate look white when electric power is shut off, resulting in poor appearance. Particularly an anti-glare-treated front surface of the transparent substrate is likely to have dust, stains, scratches, etc.

OBJECT OF THE INVENTION

Accordingly, an object of the present invention is to provide a protective cover having excellent visibility for a display panel, and its use.

DISCLOSURE OF THE INVENTION

As a result of intense research in view of the above object, the inventors have found that excellent visibility can be achieved inexpensively by mounting a protective cover comprising a transparent substrate and an anti-reflection, transparent medium layer comprising hollow, transparent, fine particles dispersed in a transparent resin matrix both having mutually adjusted refractive indexes, to a display panel, such that the anti-reflection, transparent medium layer is sealed without gap between the transparent substrate and an image-displaying area of the display panel. The present invention has been completed based on such finding.

Thus, the protective cover of the present invention for a display panel comprises a transparent substrate, and an anti-reflection, transparent medium layer comprising hollow, transparent, fine particles dispersed in a transparent resin matrix and sealed without gap between the transparent substrate and an image-displaying area of the display panel, the refractive index $N_1$ of the anti-reflection, transparent medium layer and the refractive index Ns of the transparent substrate meeting the following relation (1):

$$No<N_1<Ns^2 \tag{1},$$

wherein No is the refractive index of air.

The hollow, transparent, fine particles are preferably hollow, transparent, fine ceramic particles and/or hollow, transparent, fine resin particles, more preferably hollow, transparent, fine silica particles. The hollow, transparent, fine particles preferably have a particle size distribution in a range of 0.3-30 µm. The amount of the hollow, transparent, fine particles is preferably 0.1-30% by mass based on the total amount (100% by mass) of the transparent resin matrix and the hollow, transparent, fine particles. With the particle size distribution and amount of the hollow, transparent, fine particles within the above ranges, the protective cover provides excellent anti-glare characteristics.

The transparent substrate is preferably mounted to the display panel via an annular seal along a periphery of the substrate. The anti-reflection, transparent medium is preferably filled in a space sealed by the annular seal between the display panel and the transparent substrate. The transparent substrate is preferably made of polymethyl methacrylate. The transparent resin matrix is preferably made of an ultraviolet-curable acrylate resin.

The transparent substrate preferably comprises an anti-reflection layer on its front surface. The transparent substrate preferably comprises a dark-color coating layer on its peripheral portion. The display panel is preferably a liquid crystal module having an image-displaying area formed by a liquid crystal filled in a space sealed between opposing substrates.

The protective cover of the present invention for a display panel is suitable for a digital camera.

DESCRIPTION OF THE PREFERRED EMBODIMENTS

Figure 11:
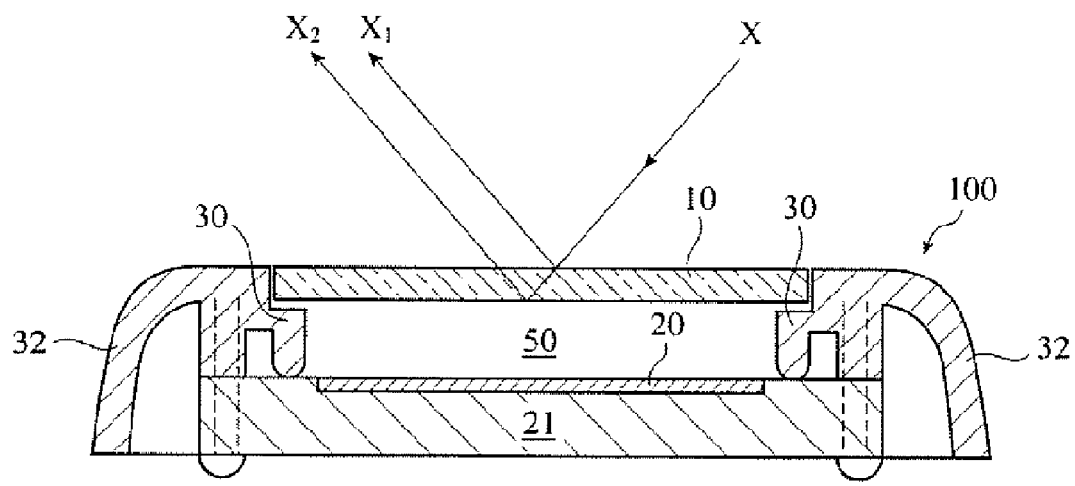
FIG. 11 is a cross-sectional view showing a conventional protective cover mounted to a liquid crystal panel.

The structure of the protective cover of the present invention will be explained referring to the attached drawings, with the same reference numerals assigned to the same parts as in FIG. 11 unless otherwise mentioned. The explanation of the protective cover shown in FIG. 11 should thus be referred, if necessary.

[1] Structure of Protective Cover

Figure 1:
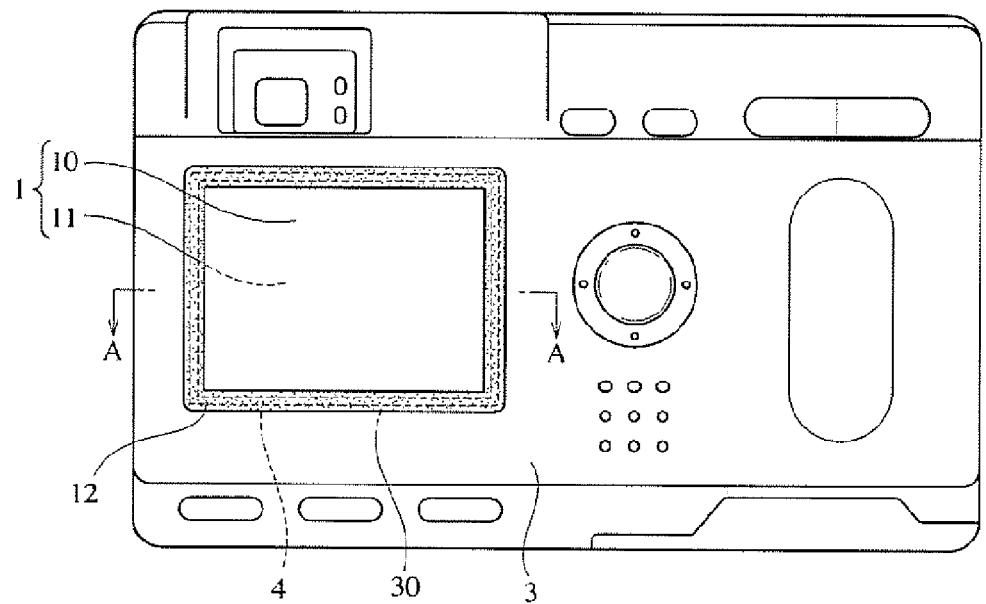
FIG. 1 is a rear view showing one example of digital cameras, to which the protective cover of the present invention is mounted.
Figure 2A:
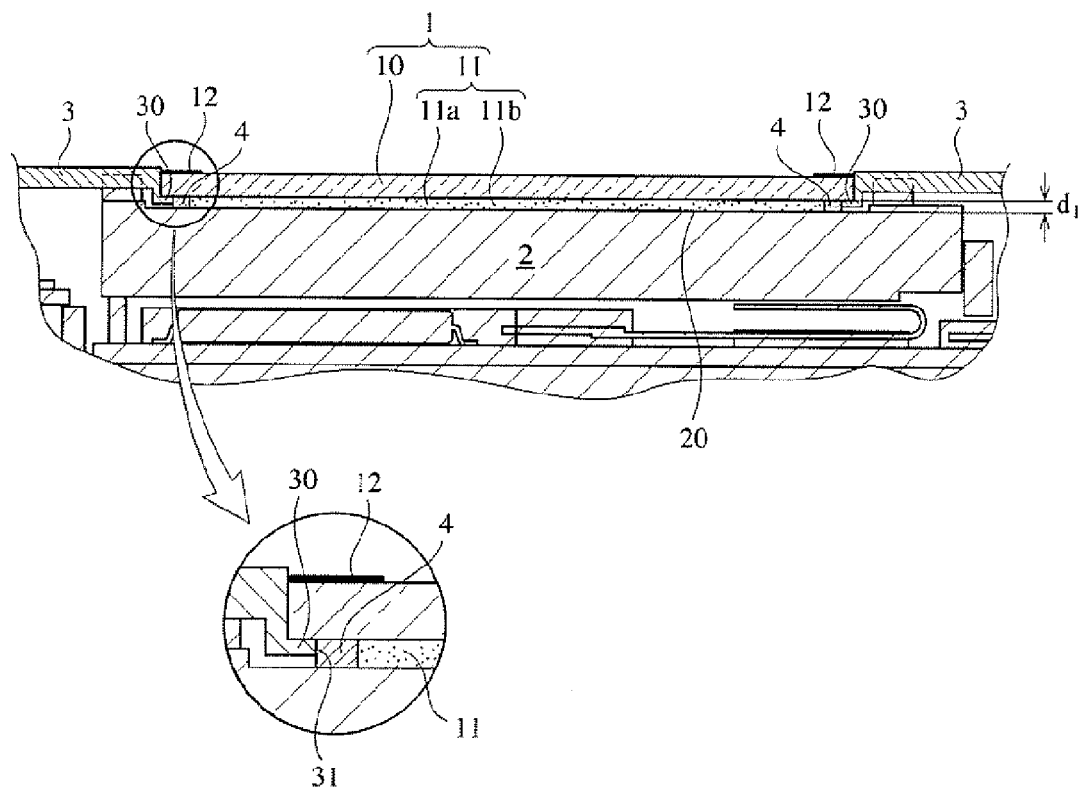
FIG. 2(a) is a partial cross-sectional view taken along the line A-A in FIG. 1.
Figure 2B:
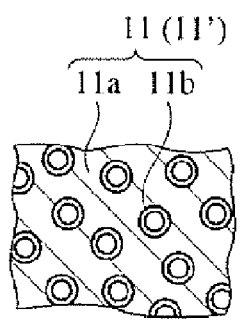
FIG. 2(b) is a partially enlarged cross-sectional view of FIG. 2(a).

FIGS. 1 and 2 show one example of the protective covers of the present invention for display panels. In this example, the protective cover 1 is mounted to a liquid crystal module 2 assembled in a digital camera. The protective cover 1 comprises a transparent substrate 10, and an anti-reflection, transparent medium layer 11 having hollow, transparent, fine particles 11b dispersed in a transparent resin matrix 11a, the anti-reflection, transparent medium layer 11 being sealed without gap between the transparent substrate 10 and an image-displaying area 20 of the liquid crystal module 2. The liquid crystal module 2 comprises a liquid crystal panel (liquid crystal cell) for displaying image formed by a liquid crystal filled in a space sealed between opposing substrates, a circuit board comprising a driver IC for driving the liquid crystal, a controller for the driver IC and other electronic parts, a backlight, etc. Because the structure of the liquid crystal module 2 per se is known, its explanation will be omitted here.

A rear cover 3 of the digital camera has an opening for exposing the liquid crystal module 2, and the opening is provided with an internal, annular flange 30 for supporting the transparent substrate 10. The transparent substrate 10 is mounted to the liquid crystal module 2 via an annular seal 4 disposed along an inner, annular edge 31 of the internal, annular flange 30. A rear peripheral portion of the transparent substrate 10 is bonded to the internal, annular flange 30. A space 50 sealed by the transparent substrate 10, the liquid crystal module 2 and the annular seal 4 is filled with an uncured transparent medium 11' having hollow, transparent, fine particles 11b dispersed in a transparent liquid resin 11a [see FIG. 2(b)]. The seal 4 ensures the uncured transparent medium 11' to be charged into the space 50 under pressure while sealing. The uncured transparent medium 11' in the space 50 is finally cured.

Figure 3:
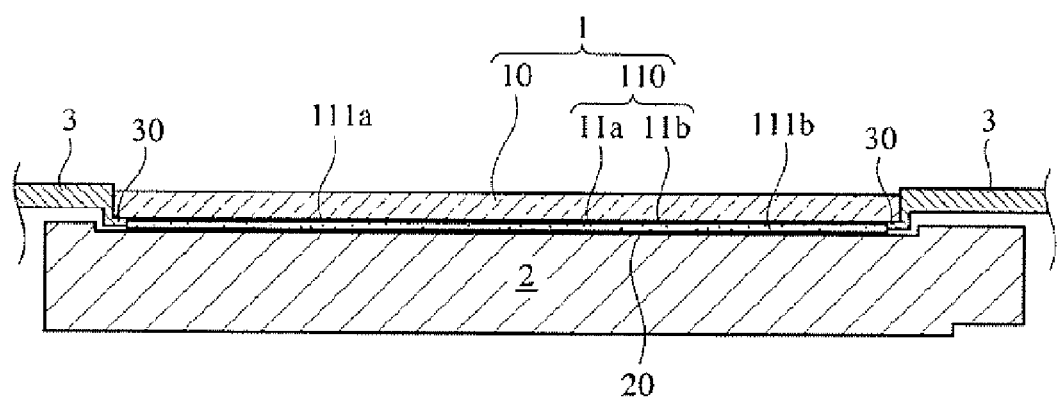
FIG. 3 is a partial cross-sectional view showing another example of digital cameras, to which the protective cover of the present invention is mounted.

FIG. 3 shows another example of the protective covers of the present invention for display panels. The same reference numerals are assigned to the same parts or portions as in the example shown in FIG. 2(a). In this example, an anti-reflection, transparent medium layer 110 is a film having hollow, transparent, fine particles 11b dispersed in a transparent resin 11a, and the film is adhered to the transparent substrate 10 and the liquid crystal module 2 via transparent adhesion layers 111a and 111b, respectively,

[2] Layer Structure of Protective Cover (1) Transparent Substrate

Though not particularly restricted, materials for the transparent substrate 10 may be, for instance, polymethacrylates (refractive index: 1.45-1.53), polycarbonates (refractive index: 1.55-1.6, visible light transmittance: 90%), cellulose triacetate (refractive index: 1.50, visible light transmittance: 90%), amorphous polyolefins (refractive index: 1.53), silica glass (refractive index: 1.46), various types of inorganic glass (refractive index: 1.45-1.85), etc. Among them, inexpensive polymethacrylates or polycarbonates with excellent transparency are preferable, and polymethyl methacrylate (PMMA) (refractive index: 1.48-1.52, visible light transmittance: 93%) is more preferable.

The thickness of the transparent substrate 10 may be properly determined depending on the desired strength, etc. When the protective cover 1 is used for a digital camera, it is usually as thick as 0.5-1 mm.

The transparent substrate 10 is preferably provided with an anti-reflection coating on its front surface (forward surface in FIG. 1). A known anti-reflection coating may be properly selected depending on the refractive index of a material forming the transparent substrate 10. When the transparent substrate 10 is made of PMMA, anti-reflection coating materials may be inorganic materials such as $MgF_2$ (refractive index: 1.38), silica aerogel (refractive index: 1.05-1.35), etc. Though the anti-reflection coating may be a single-layer coating, it may be a laminate constituted by pluralities of layers with different refractive indexes, if necessary. The anti-reflection coating may be made of an inorganic material only, or may be a composite layer comprising fine inorganic particles dispersed in a binder The binder may be PMMA non-crystalline fluororesins, etc.

When the anti-reflection coating is made of an inorganic material, it may be formed by physical vapor deposition such as vacuum vapor deposition, sputtering, ion-plating, etc., or chemical vapor deposition such as thermal CVD, plasma CVD, light CVD, etc. The composite layer of fine inorganic particles and a binder may be formed by wet methods such as dip-coating, spin-coating, spraying, roll-coating, screen-printing, etc. The resin layer may be formed by chemical vapor deposition or the above wet methods.

A rear surface of the transparent substrate 10 (on the side of the anti-reflection, transparent medium layer 11 or 110) may be subjected to a known anti-glare treatment, which is, for instance, coating of fine organic or inorganic particles, a chemical or physical treatment, attaching of an anti-glare film, etc. The fine organic particles may be fine polystyrene particles, fine acrylate particles, etc. The fine inorganic particles may be fine silica particles, etc. The fine organic particles and/or the fine inorganic particles with a binder are coated onto the transparent substrate 10. The binder may be, for instance, PMMA, noncrystalline fluororesins, etc. The chemical treatment may be the treatment of the transparent substrate 10 with chemicals, etc. The physical treatment may be blasting, etc. The anti-glare film may be a transparent film containing the above fine organic particles and/or fine inorganic particles, an embossed transparent film, etc.

To avoid decrease in light transmittance, the anti-glare layer preferably has a refractive index $N_2$ meeting the following relation (2):

$$0.01 \leq |N_2 - N_1| \leq 1.0 \qquad (2),$$

wherein $N_1$ is a refractive index of the anti-reflection, transparent medium layer 11, 110.

The transparent substrate 10 may have an antistatic layer, a hard layer, an anti-stain layer, an anti-fogging layer, a conductive layer; a shock-absorbing layer, etc. on its front surface, if necessary.

To have improved appearance, as shown in FIGS. 1 and 2, the transparent substrate 10 is preferably provided on its front periphery with an annular dark-color coating layer 12 covering the seal 4. The dark-color coating layer 12 may be formed by screen-printing. The color of the dark-color coating layer 12 may be properly determined depending on the color of a camera body, etc. For instance, it is preferably black. The dark-color coating layer 12 is not restricted to the front periphery of the transparent substrate 10, but may be formed in a rear periphery or front and rear peripheries, if necessary.

(2) Anti-Reflection, Transparent Medium Layer (a) Refractive Index

The refractive index $N_1$ of the anti-reflection, transparent medium layer 11, 110 should meet the following relation (1):

$$No < N_1 < Ns^2 \qquad (1),$$

wherein No is the refractive index of air, and Ns is the refractive index of the transparent substrate. The anti-reflection, transparent medium layer 11, 110 having a refractive index $N_1$ meeting the above relation (1) provides an excellent anti-reflection effect.

The refractive index $N_1$ of the anti-reflection, transparent medium layer 11, 110 preferably meets the following relation (3):

$$1.1 \times No < N_1 < 0.9 \times Ns^2 \qquad (3),$$

wherein No and Ns are the same as in the relation (1), more preferably meets the following relation (4):

$$1.2 \times No < N_1 < 0.8 \times Ns^2 \qquad (4),$$

wherein No and Ns are the same as in the relation (1).

(b) Visible Light Transmittance

Though not particularly restricted, the visible light transmittance of the anti-reflection, transparent medium layer 11, 110 is preferably 70% or more, more preferably 85% or more. The thickness of the anti-reflection, transparent medium layer 11, 110 is identical to the distance $d_1$ between the transparent substrate 10 and the liquid crystal module 2. In the case of a digital camera, for instance, the distance $d_1$ is usually 0.2-0.5 mm.

(c) Transparent Resin and Hollow, Transparent, Fine Particles

In the anti-reflection, transparent medium layer 11, 110, the hollow, transparent, fine particles 11b are dispersed in a transparent resin matrix 11a.

(i) Transparent Resin

The transparent resin 11a constituting a matrix of the anti-reflection, transparent medium layer 11, 110 is not restrictive as long as the refractive index $N_1$ of the anti-reflection, transparent medium layer 11, 110 meets the above relation (1). Examples of the transparent resin 11a include acrylate resins (refractive index: 1.45-1.57), nitrocelluloses (refractive index: 1.46-1.51, visible light transmittance: 90%), cellulose triacetate (refractive index: 1.50, visible light transmittance: 90%), cellulose acetate butyrate (refractive index: 1.47, visible light transmittance: 87%), cellulose tributyrate (refractive index: 1.48, visible light transmittance: 91%), polyvinyl chloride (refractive index: 1.53, visible light transmittance: 70%), polystyrenes (refractive index: 1.59-1.60, visible light transmittance: 90%), polyethylene terephthalate (refractive index: 1.65, visible light transmittance: 87%), polycarbonates (refractive index: 1.55-1.6, visible light transmittance: 90%), amorphous polyolefins (refractive index: 1.53), polyvinyl alcohols (refractive index: 1.49-1.52), polyethylene glycols (refractive index: 1.45-1.46), epoxy resins (refractive index: 1.55-1.61), tetraacetyl cellulose (refractive index: 1.47), polysulfone (refractive index: 1.63), styrene-acrylate copolymers, etc.

Preferable as the transparent resin 11a are ultraviolet-curable acrylate resins. The more preferred acrylate resins are epoxy acrylates, urethane acrylates, polyester acrylates and acrylate resin acrylates. The acrylate resins are not restricted to (meth)acrylate homopolymers, but may be copolymers with other unsaturated monomers. The other unsaturated monomer may be styrene.

(ii) Hollow, Transparent, Fine Particles

Each hollow, transparent, fine particle 11b has a wall made of a transparent material with space inside. Because the hollow, transparent, fine particle 11b having a small size with large refractive index difference between the wall and the internal space can scatter light, the anti-reflection, transparent medium layer 11, 110 containing the hollow, transparent, fine particles 11b can scatter reflected light, resulting in excellent anti-glare characteristics.

As long as the refractive index $N_1$ of the anti-reflection, transparent medium layer 11, 110 meets the above relation (1), the refractive index of the hollow, transparent, fine particles is not particularly restrictive, though it is preferably 1.4-1.7. Materials for forming the hollow, transparent, fine particles 11b may be, for instance, transparent ceramics, transparent resins, etc. The transparent ceramics may be silica, borosilicate glass, soda-lime glass, etc. The transparent resins may be the same as for the matrix.

The hollow, transparent, fine particles 11b are preferably spherical. The particle size distribution range of the hollow, transparent, fine particles 11b is preferably 0.3-30 μm, more preferably 0.4-20 μm. When this particle size distribution is less than 0.3 μm, there is no large light-scattering effect, resulting in insufficient anti-glare characteristics. When the particle size distribution is more than 30 μm, the displayed image is deformed, rather lowering visibility. The particle size distribution was measured by a liquid-borne particle counter (KL-11A with a KS-65 sensor, available from RION Co., Ltd.). The inner diameters (diameters of internal space) of the hollow, transparent, fine particles 11b are preferably 0.5-0.9 times, more preferably 0.7-0.8 times, their outer diameters.

The internal space of the hollow, transparent, fine particle 11b is preferably filled with air. Although the hollow, transparent, fine particle 11b preferably has an internal space not communicating with the outside, it may have small apertures open to the outside as long as the transparent resin matrix 11a does not substantially enter into the particle 11b.

The hollow, transparent, fine particles 11b may be surface treated. Surface-treating agents include, for instance, various silane coupling agents, aliphatic acids such as stearic acid, and their derivatives, etc. The hollow, transparent, fine ceramic particles 11b may be acid-treated. The acid treatment removes sodium salts from the surface, preventing the discoloration and deterioration of the transparent resin matrix 11a.

The hollow, transparent, fine ceramic particles 11b can be produced by methods described in JP 61-174145A, JP 36-12577B, U.S. Pat. No. 3,796,777, JP 58-120525A, JP 43-2107B, JP 49-37565B, JP 10-258223A, JP 2004-285394A, JP 2004-284864A, etc. The hollow, transparent, fine ceramic particles 11b are commercially available as Fuji Balloon (Fuji Silysia Chemical Ltd.), etc.

The hollow, transparent, fine resin particles 11b can be produced by methods described in JP 5-125127A, etc. The hollow, transparent, fine resin particles 11b are commercially available as JSR hollow particles (made of cross-linked styrene-acrylate copolymer, available from JSR Corp.), Advancell (made of acryl, available from Sekisui Chemical Co., Ltd.), Ganz Pearl (made of polymethyl methacrylate and polystyrene, available from Ganz Chemical Co., Ltd.), etc.

The amount of hollow, transparent, fine particles 11b is preferably 0.1-30% by mass, more preferably 0.3-20% by mass, based on the total amount (100% by mass) of the transparent resin matrix 11a and the hollow, transparent, fine particles 11b, to obtain good anti-glare characteristics.

(d) Transparent Adhesion Layer

The transparent adhesive layers 111a, 111b shown in FIG. 3 may be made, for instance, of epoxy-acrylate resins.

[3] Reflectance of Protective Cover

The protective cover 1 according to a preferred embodiment of the present invention has reflectance of 6% or less in a visible light region.

[4] Method of mounting protective cover to display panel

Taking for example a liquid crystal module assembled in a digital camera, the mounting of the protective cover of the present invention to a display panel will be explained below. The mounting methods include (1) a first method of charging an uncured transparent medium 11' comprising the hollow, transparent, fine particles 11b, the ultraviolet-curable, transparent liquid resin 11a and a photopolymerization initiator into a space 50 between the transparent substrate 10 and the liquid crystal module 2, and curing the resin 11a, and (2) a second method of dispersing the hollow, transparent, fine particles 11b in the transparent resin 11a to form a transparent medium film 110 in advance, and adhering the film 110 to the transparent substrate 10 and the liquid crystal module 2 via each transparent adhesion layer 111a, 111b.

(1) First Method

Figure 4A:
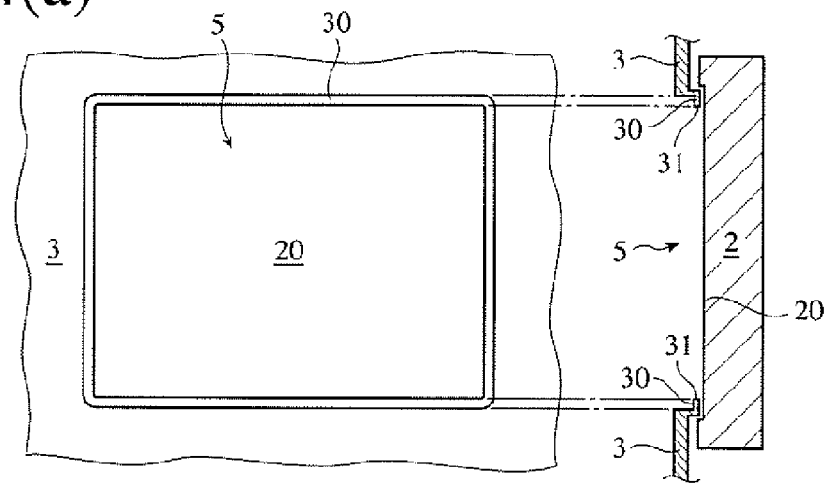
FIG. 4(a) is a partial rear view with a cross section showing a rear cover of the digital camera having an opening, through which a liquid crystal module is exposed.
Figure 4B:
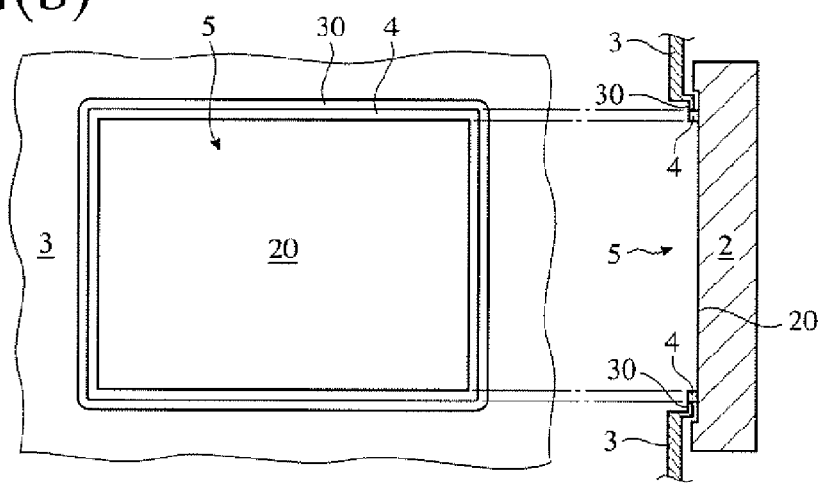
FIG. 4(b) is a partial rear view with a cross section showing the liquid crystal module of the digital camera shown in FIG. 4(a), to which an annular sealant is attached.
Figure 4C:
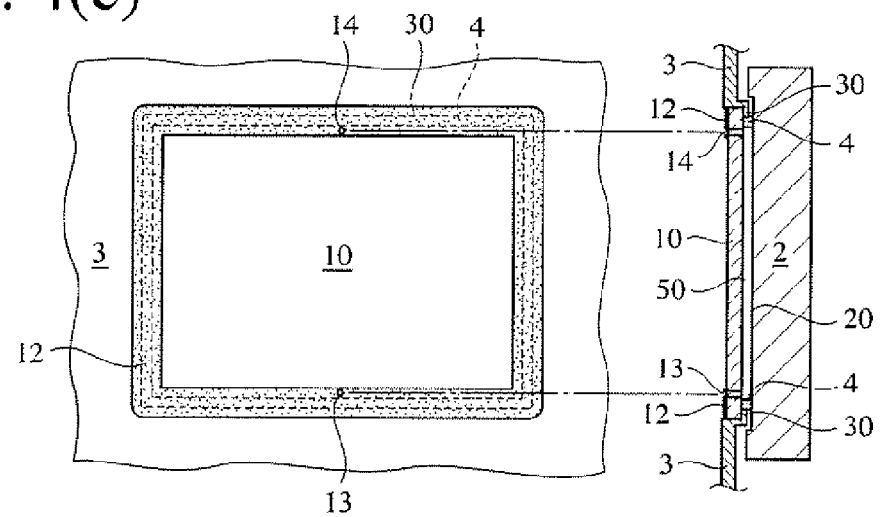
FIG. 4(c) is a partial rear view with a cross section showing a transparent substrate mounted to the liquid crystal module via the annular sealant shown in FIG. 4(b) with a space therebetween.

As shown in FIG. 4(a), the rear cover 3 of the digital camera is provided in advance with an opening 5 in a region corresponding to an image-displaying area 20 of the liquid crystal module 2. As shown in FIG. 4(b), an annular, uncured sealant 4' is attached to an annular edge 31 of an internal, annular flange 30 of the rear cover 3. Preferred uncured sealants 4' are ultraviolet-curable acrylate resins, etc. As shown in FIG. 4(c), the transparent substrate 10 is adhered to a front surface of the internal, annular flange 30, to provide a space 50 defined by the liquid crystal module 2, the transparent substrate 10 and the uncured annular sealant 4', which is to be filled with an uncured transparent medium 11'. The annular sealant 4' is then cured to form an annular seal 4.

The uncured transparent medium 11' is prepared by dispersing the hollow, transparent, fine particles 11b and a photopolymerization initiator in the ultraviolet-curable, transparent liquid resin 11a. The uncured transparent medium 11' is preferably deprived of pores by evacuation before filling. Known photopolymerization initiators such as acetophenones, benzoins, benzophenones, thioxanthones, etc. may be used.

Figure 5:
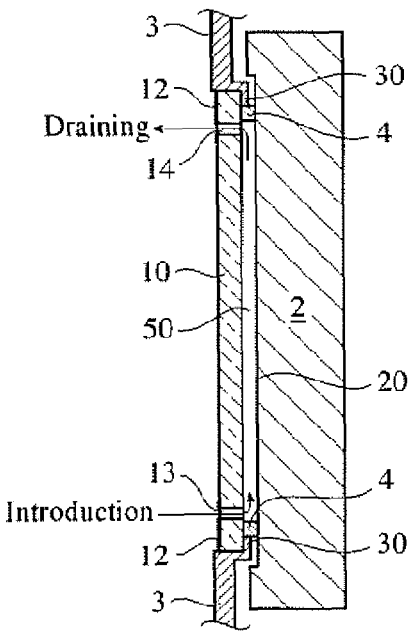
FIG. 5 is a partial cross-sectional view showing one example of methods for filling the space shown in FIG. 4(c) with an anti-reflection transparent medium.

As shown in FIGS. 4(c) and 5, the transparent substrate 10 is provided with an inlet aperture 13 for introduced the uncured transparent medium 11' and an outlet aperture 14 for draining it at positions inside the annular seal 4. As shown in FIG. 5, the uncured transparent medium 11' is introduced into the space 50 through the inlet aperture 13 under pressure while draining an excess uncured transparent medium 11' through the outlet aperture 14, so that the space 50 is filled with the uncured transparent medium 11' without pores. As shown in FIG. 4(c), the apertures 13 and 14 are preferably provided in a region in which an annular dark-color coating layer 12 is formed. It should be noted that the apertures 13 and 14 are not restricted to the depicted positions but may be formed, for instance, at diagonally opposing positions in the transparent substrate 10. Also, the transparent substrate 10 may be provided with pluralities of apertures 13 for introducing the uncured transparent medium 11' and pluralities of apertures 14 for draining it.

Figure 6:
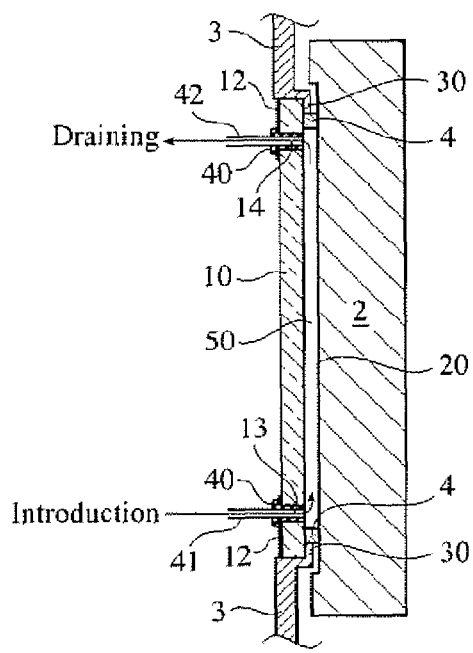
FIG. 6 is a partial cross-sectional view showing another example of methods for filling the space shown in FIG. 4(c) with an anti-reflection transparent medium.

As shown in FIG. 6, a supply pipe 41 and a discharge pipe 42 may be connected to the apertures 13 and 14, respectively, each via a rubber packing 40 without gap, if necessary, to introduce the uncured transparent medium 11' into the space 50 under pressure. If necessary, the discharge pipe 42 may be connected to a vacuum suction means such as a vacuum pump, so that the uncured transparent medium 11' is supplied under pressure while evacuating the space 50.

Figure 7:
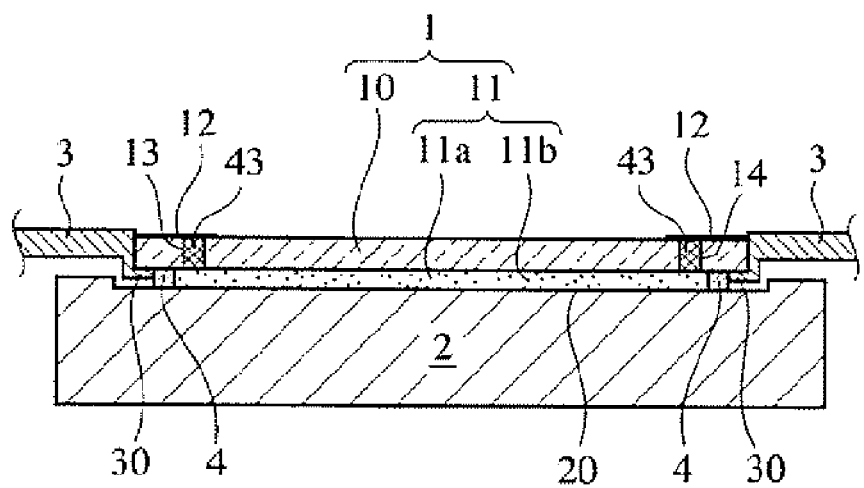
FIG. 7 is a partial cross-sectional view showing an anti-reflection, transparent medium sealed in the space shown in FIG. 4(c).

After the space 50 is filled with the uncured transparent medium 11', as shown in FIG. 7, an adhesive 43 is charged into a space in each aperture 13, 14, which is generated by detaching the pipes 41, 42, and cured to seal the apertures 13, 14. Though not particularly restricted, the adhesive 43 is preferably ultraviolet-curable from the aspect of quick solidification by ultraviolet irradiation. The ultraviolet-curable adhesive 43 may be an acrylic adhesive, an epoxy adhesive, etc. The acrylic adhesive is preferably made of PMMA.

Figure 8A:
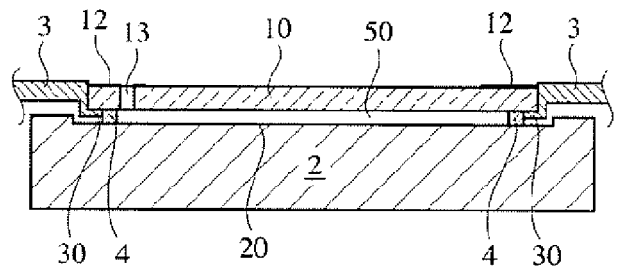
FIG. 8(a) is a partial cross-sectional view showing a transparent substrate having only one aperture, which is mounted to a liquid crystal module via an annular seal with a space therebetween.
Figure 8B:
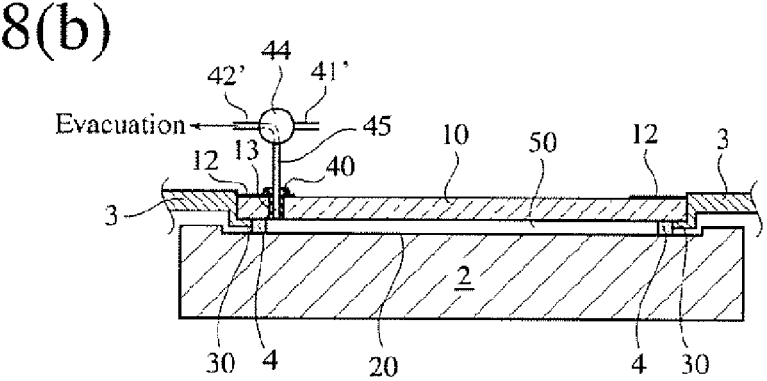
FIG. 8(b) is a partial cross-sectional view showing the evacuation of the space shown in FIG. 8(a).
Figure 8C:
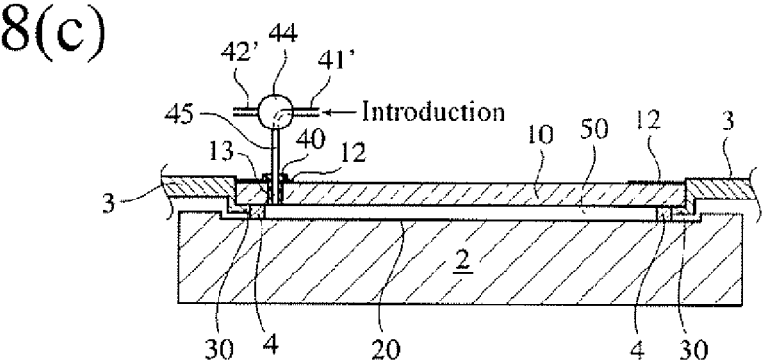
FIG. 8(c) is a partial cross-sectional view showing the filling of an uncured, anti-reflection, transparent medium in the space shown in FIG. 8(a).

The outlet aperture 14 may not be provided in the transparent substrate 10, but only the inlet aperture 13 may be provided as shown in FIG. 8(a). In this case, as shown in FIG. 8(b), an evacuating/supplying pipe 45 having a three-way valve 44 for switching an evacuating line 42' and a line 41' for supplying the uncured transparent medium 11' is connected to the inlet aperture 13 via a rubber packing 40. After the three-way valve 44 is turned to have the evacuating/supplying pipe 45 communicate with the evacuating line 42' to evacuate the space 50, as shown in FIG. 8(c), the three-way valve 44 is turned to have the evacuating/supplying pipe 45 communicate with the supply line 41' to fill the space 50 with the uncured transparent medium 11'. The uncured transparent medium 11' in the space 50 is then cured.

Figure 8D:
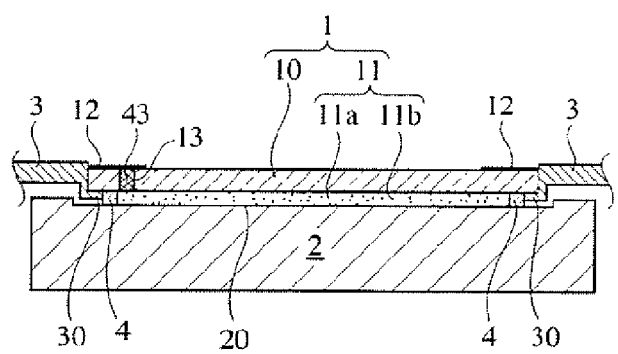
FIG. 8(d) is a partial cross-sectional view showing the anti-reflection, transparent medium seated and cured in the space shown in FIG. 8(a).

As shown in FIGS. 7 and 8(d), surfaces of the sealed apertures 13 and 14 are preferably coated with the same ink as the annular dark-color coating layer 12.

(2) Second Method

The hollow, transparent, fine particles 11b are dispersed in the transparent resin 11a to form a transparent medium film 110. The film-forming method may be, for instance, a T-die method or a casting method, though not restrictive. In the case of the T-die method, a melt blend of the transparent resin 11a and the hollow, transparent, fine particles 11b is extruded from a T-die in a film shape. The film thickness may be adjusted by a die lip gap or stretching. In the case of the casting method, a dispersion of the transparent resin 11a and the hollow, transparent, fine particles 11b in a proper solvent is cast on a horizontal plate or tray, and the solvent is evaporated. The film thickness may be adjusted by the cast amount and area or stretching. When the ultraviolet-curable transparent resin 11a is used, the film 110 formed by the T-die method or the casting method with a photopolymerization initiator added is cured by ultraviolet irradiation.

Like in the first method, the rear cover 3 is provided with an opening 5 in advance [see FIG. 4(a)], and the transparent adhesion layer 111b, the transparent medium film 110, the transparent adhesion layer 111a, and the transparent substrate 10 are laminated in this order on the liquid crystal module 2 exposed in the opening 5 [see FIG. 3]. The transparent adhesion layers 111a and 111b are preferably coated on the transparent medium film 110 in advance.

The present invention will be explained in further detail by Examples below, without intension of restricting the present invention thereto.

EXAMPLE 1

A magnesium fluoride layer (refractive index: 1.38) having an optical thickness of λ/4, wherein λ is a designed wavelength of 500 nm, was formed on one surface of a PMMA substrate 10 (refractive index: 1.49, thickness: 0.7 mm) by a vapor deposition method. After providing an inlet aperture 13 for introducing an uncured transparent medium 11' and an outlet aperture 14 for draining it in the substrate 10 as shown in FIG. 4(c), peripheral portions of the substrate 10 was provided with a black coating. The resultant transparent substrate 10 with apertures was mounted via an annular sealant 4' to a liquid crystal module 2 assembled in a digital camera by the procedures shown in FIGS. 4(a)-(c). An ultraviolet-curable PMMA adhesive was used as a medium for adhering the transparent substrate 10 to the rear cover 3 of the camera and the annular sealant 4', and cured by ultraviolet irradiation for 30 seconds by a 200-W, high-pressure mercury lamp.

An epoxy acrylate resin (Hitaloyd 7851, available from. Hitachi Chemical Co., Ltd.) and a photopolymerization initiator were charged into a vessel, and hollow, transparent, fine silica particles [Fuji Balloon having a particle size distribution of 0.5-10 μm (partially classified), available from Fuji Silysia Chemical Ltd.] were added thereto little by little while stirring, to prepare an uncured transparent medium 11' (concentration of fine particles: 0.5% by mass) in the form of a dispersion.

Figure 9:
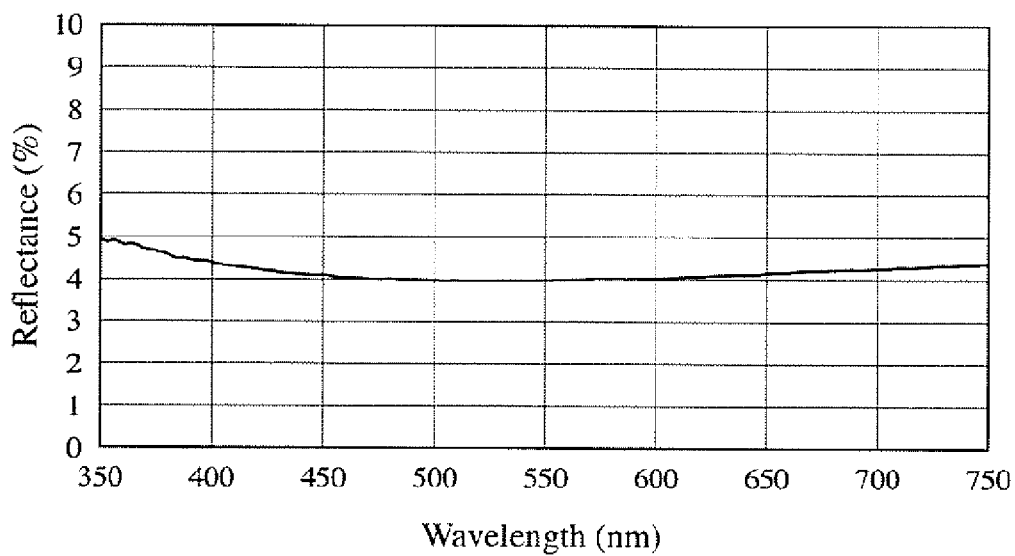
FIG. 9 is a graph showing the reflectance of the protective cover of Example 1.

The uncured transparent medium 11' was charged into a space 50 defined by the transparent substrate 10, the liquid crystal module 2 and the cured annular seal 4 with a distance of 0.35 mm between the transparent substrate 10 and the liquid crystal image-displaying area 20, through the inlet aperture 13 of the transparent substrate 10 by the procedures shown in FIGS. 6 and 7. With the inlet aperture 13 and the outlet aperture 14 of the transparent substrate 10 filled with the uncured transparent medium 11', ultraviolet irradiation was conducted for 30 seconds by a 200-W, high-pressure mercury lamp to cure the epoxy acrylate resin. The resultant anti-reflection, transparent medium layer 11 had a refractive index of 1.57. The spectrum reflection measurement of the resultant protective cover 1 revealed that it had reflectance of 5% or less to light having a wavelength of 400-700 nm as shown in FIG. 9.

Comparative Example 1

Fine polystyrene particles with a PMMA binder were applied to one surface of a 0.7-mm-thick, transparent polycarbonate substrate 10, to form an anti-glare layer having a refractive index of 1.49. With the anti-glare layer provided with a black coating in a peripheral portion, the transparent substrate 10 was mounted to a liquid crystal module 2 assembled in a digital camera with the anti-glare layer inside.

Figure 10:
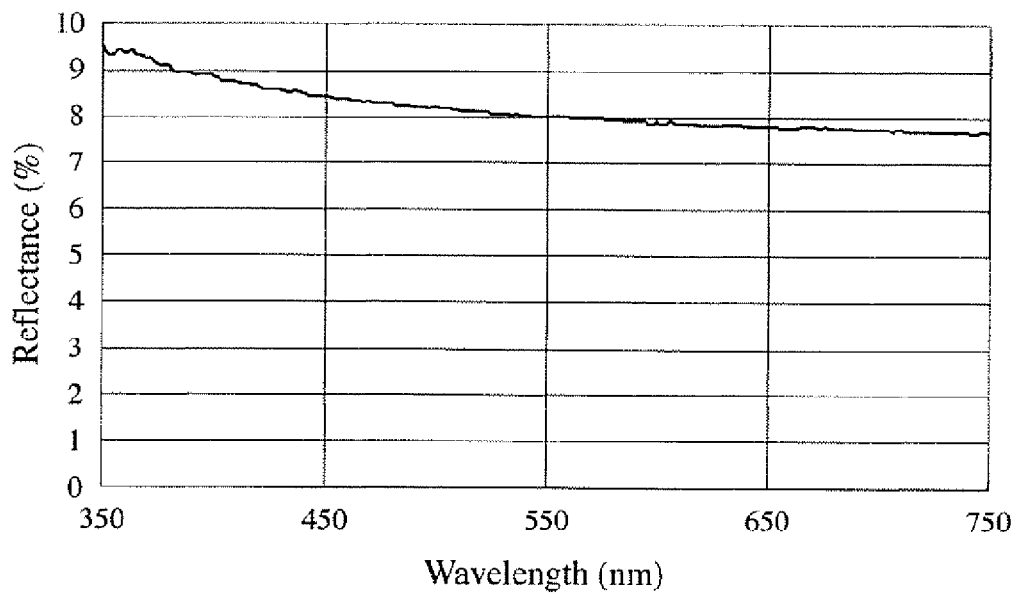
FIG. 10 is a graph showing the reflectance of the protective cover of Comparative Example 1.

A gap between the transparent substrate 10 and an image-displaying area 20 of the liquid crystal module 2 was 0.35 mm. The spectrum reflection measurement of the resultant protective cover 1 revealed that it had reflectance of more than 7% to light having a wavelength of 400-700 nm as shown in FIG. 10, clearly indicating that the protective cover 1 of Comparative Example 1 was poorer than that of Example 1.

EFFECT OF THE INVENTION

Because the protective cover of the present invention comprises a transparent substrate, and an anti-reflection, transparent medium layer having hollow, transparent, fine particles dispersed in a transparent resin matrix with their refractive indexes adjusted, excellent visibility can be obtained at a low cost by mounting the protective cover of the present invention to a display panel such that the anti-reflection, transparent medium layer is in close contact with an image-displaying area of the display panel. The protective cover of the present invention having such excellent characteristics is suitable for protecting a liquid crystal module assembled in a digital camera.

The present disclosure relates to subject matter contained in Japanese Patent Application No. 2005-332031 filed on Nov. 16, 2005, which is expressly incorporated herein by reference in its entirety.

What is claimed is:

1. A protective cover for a liquid crystal module, said protective cover comprising:
   a transparent substrate having a front surface exposed to air;
   an anti-reflection transparent medium layer comprising fine particles, which are both hollow and transparent, being dispersed within a transparent resin matrix, said anti-reflection transparent medium layer positioned behind said transparent substrate;
   wherein said fine particles have a particle size distribution in a range of approximately 0.3-30 μm;
   wherein a refractive index of the transparent resin constituting said transparent resin matrix is 1.45-1.65;
   wherein the amount of said fine particles is 0.1-30% by mass based on the total amount (100% by mass) of said transparent resin matrix and said fine particles;
   wherein said anti-reflection transparent medium layer is positioned in front of an image-displaying area of said liquid crystal module;
   wherein said anti-reflection transparent medium layer is sealed without a gap between said transparent substrate and said image-displaying area of said liquid crystal module such that a first surface of said anti-reflection transparent medium layer contacts said transparent substrate and a second surface of said anti-reflection transparent medium layer contacts said liquid crystal module, and a refractive index $N_1$ of said anti-reflection transparent medium layer and a refractive index Ns of said transparent substrate satisfying the relation:

$No < N_1 < Ns^2$; and wherein No is a refractive index of air.

2. The protective cover for a liquid crystal module according to claim 1;
   wherein said fine particles comprise at least one of ceramic particles and resin particles.

3. The protective cover for a liquid crystal module according to claim 2;
   wherein said ceramic particles comprise silica particles.

4. The protective cover for a liquid crystal module according to claim 1;
wherein said transparent substrate is mounted to said liquid crystal module via an annular seal along a periphery of said substrate, and wherein said anti-reflection transparent medium is filled in a space sealed by said annular seal, said space being provided between said liquid crystal module and said transparent substrate.

5. The protective cover for a liquid crystal module according to claim 1;
wherein said transparent substrate comprises polymethyl methacrylate, and wherein said transparent resin matrix comprises an ultraviolet-curable acrylate resin.

6. The protective cover for a liquid crystal module according to claim 1, further comprising:
a dark-color coating layer provided on a peripheral portion of said transparent substrate.

7. The protective cover for a liquid crystal module according to claim 1;
wherein said liquid crystal module comprises a liquid crystal module having an image-displaying area formed by a liquid crystal filled within a space, said space being sealed between opposing substrates.

8. A digital camera comprising a liquid crystal module provided with the protective cover recited in claim 1.

9. A protective cover for a liquid crystal module, said protective cover comprising:
a transparent substrate having a front surface exposed to air;
an anti-reflection transparent medium layer comprising fine particles, which are both hollow and transparent, being dispersed within a transparent resin matrix, said anti-reflection transparent medium layer positioned behind said transparent substrate;
wherein said fine particles have a particle size distribution in a range of approximately 0.3-30 μm;
wherein a refractive index of the transparent resin constituting said transparent resin matrix is 1.45-1.65;
wherein the amount of said fine particles is 0.1-0.5% by mass based on the total amount (100% by mass) of said transparent resin matrix and said fine particles;
wherein said anti-reflection transparent medium layer is positioned in front of an image-displaying area of said liquid crystal module;
wherein said anti-reflection transparent medium layer is sealed without a gap between said transparent substrate and said image-displaying area of said liquid crystal module such that a first surface of said anti-reflection transparent medium layer contacts said transparent substrate and a second surface of said anti-reflection transparent medium layer contacts said liquid crystal module, and a refractive index $N_1$ of said anti-reflection transparent medium layer and a refractive index Ns of said transparent substrate satisfying the relation:

$No < N_1 < Ns^2$; and wherein No is a refractive index of air.

10. A digital camera comprising a liquid crystal module provided with the protective cover recited in claim 9.

* * * * *